United States Patent
Marti et al.

(10) Patent No.: US 11,852,394 B1
(45) Date of Patent: Dec. 26, 2023

(54) SYSTEM, METHOD AND APPARATUS FOR REMOTELY MONITORING INVENTORY

(71) Applicant: ICE Q, LLC, Alamo, CA (US)

(72) Inventors: Juan E. Marti, Danville, CA (US); Nicolas Garcia, Castro Valley, CA (US); Patrick J. Inglesby, Danville, CA (US)

(73) Assignee: ICE Q, LLC, Danville, CA (US)

( * ) Notice: Subject to any disclaimer, the term of this patent is extended or adjusted under 35 U.S.C. 154(b) by 511 days.

(21) Appl. No.: 16/831,767

(22) Filed: Mar. 26, 2020

Related U.S. Application Data

(60) Provisional application No. 62/824,867, filed on Mar. 27, 2019.

(51) Int. Cl.
*F25C 5/187* (2018.01)
*G01S 17/08* (2006.01)

(52) U.S. Cl.
CPC ............. *F25C 5/187* (2013.01); *G01S 17/08* (2013.01); *F25C 2700/02* (2013.01)

(58) Field of Classification Search
CPC ...... F25C 5/187; F25C 2700/02; G01S 17/08; G01S 7/4047; G01B 11/24; G01B 7/023
See application file for complete search history.

(56) References Cited

U.S. PATENT DOCUMENTS

| | | | | |
|---|---|---|---|---|
| 5,708,223 | A | * | 1/1998 | Wyss .................... G01M 19/00 73/865.9 |
| 8,328,438 | B2 | * | 12/2012 | Johnson et al. ....... G03B 17/00 396/427 |
| 8,545,113 | B2 | | 10/2013 | Johnson et al. |
| 11,300,662 | B1 | * | 4/2022 | Milton .................... G01S 17/06 |
| 2016/0371977 | A1 | * | 12/2016 | Wingate et al. ..... G08G 1/0968 |
| 2018/0239023 | A1 | * | 8/2018 | Rubin ..................... G01S 17/93 |
| 2019/0025430 | A1 | * | 1/2019 | Rohani et al. ......... G01S 17/89 |

OTHER PUBLICATIONS

VL53L0X—World's smallest Time-of-Flight ranging and gesture detection sensor, Datasheet—production data, DocID029104 Rev 2, STMicroelectronics NV, Apr. 2018.
Cree XLamp ML-E LEDs, CREE Product Family Data Sheet, CLD-DS30 Rev 11G, Cree, Inc., Durham, NC, (c) 2010-2017.

* cited by examiner

*Primary Examiner* — Elizabeth J Martin
*Assistant Examiner* — Dario Antonio Deleon
(74) *Attorney, Agent, or Firm* — TIPS Group

(57) ABSTRACT

An ice merchandiser with a remote monitoring system is provided with one or more LiDAR modules positioned near a top surface an icebox such that the fields-of-view of the LiDAR modules are at least partially directed towards a bottom surface of the icebox. The LiDAR modules provide distance data to the inventory stored within the icebox to a controller located outside of the icebox via a cable that includes both power and data lines. The controller processes the distance data to provide an estimate of the current inventory of the ice merchandiser and communicates at least one of inventory data and other sensor data concerning the operation of the ice merchandiser to a remote server via a network.

16 Claims, 7 Drawing Sheets

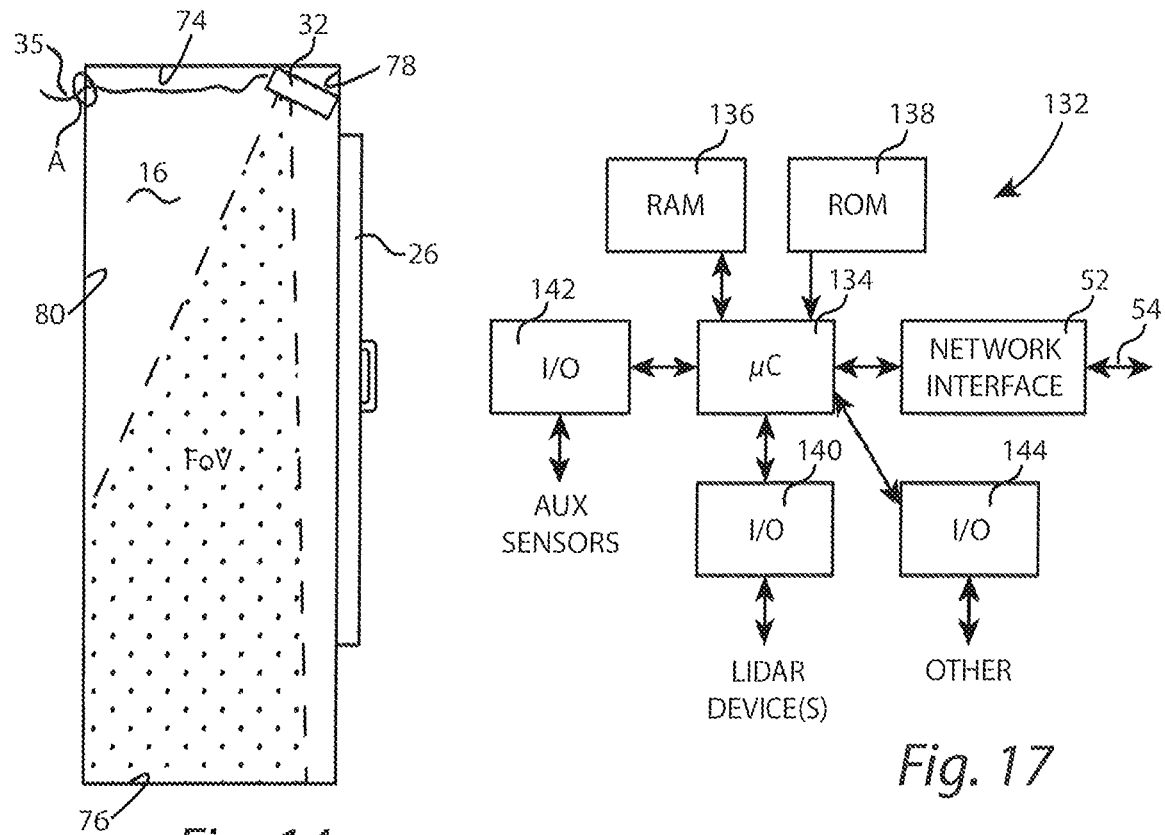
Fig. 14
Fig. 17
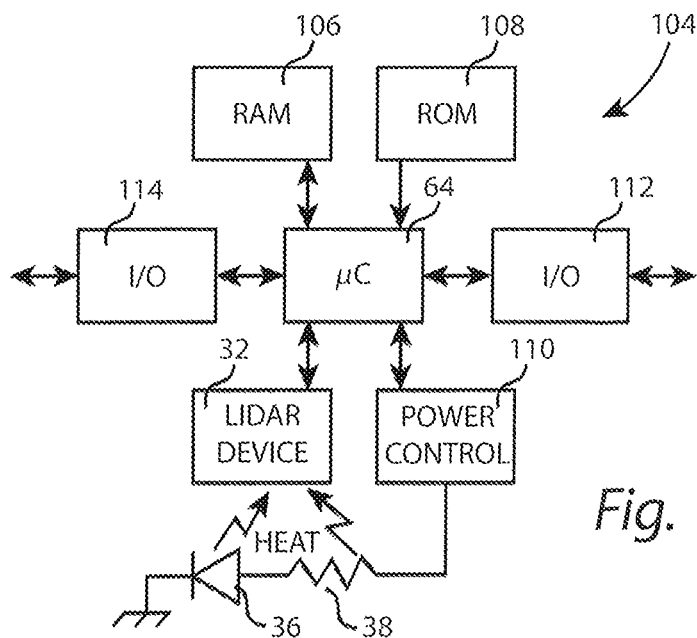
Fig. 15

SYSTEM, METHOD AND APPARATUS FOR REMOTELY MONITORING INVENTORY

CROSS REFERENCE TO RELATED APPLICATION(S)

This application claims the benefit of Provisional Patent Application No. 62,824,867, filed Mar. 27, 2019, incorporated herein by reference.

BACKGROUND

Ice distribution companies are in the business of distributing their products, typically packaged ice, to various retail locations such as grocery stores, convenience stores, gas stations, etc. If a retail location only needs to maintain a small inventory of packaged ice a conventional freezer can be used, but for large inventories of packaged ice a commercial, standalone freezer for ice storage known as an "ice merchandizer" is often the right choice.

FIG. 1 is a perspective view of a conventional ice merchandiser 10 which includes a large, rectangular ice storage unit 12 topped by a compressor system 14. It should be noted that this upright configuration for an ice merchandizer 10 is only one example, other examples being low profile and slant configurations with integrated or external compressor systems. The compressor system 14 includes a compressor, heat exchanger and controls (not shown) for circulating a refrigerant through coolant lines to maintain the internal temperature of the ice storage unit 12 below freezing.

FIG. 2 is a simplified cross-sectional view taken along line 2-2 of FIG. 1 to further illustrate the construction of the ice storage unit 12. With reference to both FIGS. 1 and 2, ice storage unit 12 has a box-within-a-box construction including a steel inner liner (icebox) 16 and a steel outer shell 18. Insulation 20 is provided between the liner 16 and shell 18 to provide good thermal insulation of the internal volume 22 of the icebox 16 where an inventory of packaged ice 24 can be stored. In this example, the ice storage unit is provided with insulating doors 26 to allow access to the internal volume 22 of the icebox 16 through access openings 28.

One of the largest cost centers for ice distribution companies is the labor and equipment used to deliver products to retail locations to restock their ice merchandisers. Ideally, ice distribution companies would like to make the least number of restocking trips required to keep the ice merchandisers from running out of product. To achieve this goal, it would be necessary to have frequent reports of the amount of product ("inventory") that is in a given ice merchandiser. This can be accomplished manually by personal inspection of the contents of the icebox by an employee of the retail location who can then call the ice distribution company for a delivery. However, this solution is not favored by the owners or managers of the retail location in that it adds to their labor costs, resulting in the inefficiency of having ice distribution company delivering product on a set schedule.

Thomas J. Wyss ("Wyss") in U.S. Pat. No. 5,708,233 describes a remote sensing ice merchandiser including photoelectric eyes mounted within a storage chamber of an insulated cabinet to direct several beams of light across the chamber to help determine the height of stacks of packaged ice in the storage chamber. When the stacks of packaged ice reach a predetermined level, a remote inventory control station of an ice distributor can be alerted that additional product is needed. As an alternative, Wyss discloses that acoustic (e.g. ultrasonic) transducers can be mounted in the cabinet to direct sound waves into the chamber to allow a controller to develop a representation of the products in the storage chamber.

While the remote inventory monitoring systems described by Wyss have the potential to increase the efficiency of packaged ice delivery, they suffer from several drawbacks. For example, the photoelectric eye embodiment is expensive and difficult to install and calibrate and may give a false reading of the inventory if, for example, the packaged ice is unevenly stacked. Wyss' acoustic transducer embodiment is also expensive and difficult to install in that the sensors must be attached flat to the top surface of the storage container in order to properly reflect acoustic waves back from the inventory. That is, if the acoustic waves hit the inventory at an angle, false readings are likely to be obtained due to echoes and wave interference. Acoustic sensors are also of relatively low resolution, and therefore need to be positioned not only flat but in very specific locations on the to properly read the volume of ice, requiring additional hardware and labor for installation. Furthermore, the locations that the acoustic sensors must be mounted in often are near refrigerant lines, which has the potential of damaging an ice merchandiser beyond repair if, for example, a refrigerant line is ruptured with a mounting screw.

Johnson et al. ("Johnson") in original U.S. Pat. No. 8,328,438 and divisional U.S. Pat. No. 8,545,113 describe the use of sensors within an ice merchandiser to detect inventory and to digitally transmit inventory and other information over a network. In one embodiment the sensor includes a camera and a heating element, and in another embodiment one or more electronic scales are positioned within the ice merchandiser beneath the inventory of ice. Both of these solutions require expensive components and are not easily retrofitted into existing ice merchandisers, and the camera embodiment requires expensive, high bandwidth communication. Furthermore, the example sensors of Johnson do not communicate digitally with a controller but, rather, by video or analog signals which must then be processed and converted to digital data for transmission over the internet. Still further, the example sensors of Johnson must be provided with power inside of the ice merchandiser, again making retrofit versions difficult to implement.

In one embodiment of Johnson, a camera and an LED are mounted on a circuit board and enclosed in a transparent camera enclosure such that the LED can convectively heat the camera by the air trapped within the enclosure to prevent moisture from condensing or freezing on the camera lens. In another embodiment the LED is positioned very close to the camera to radiantly heat the camera lens to prevent condensing or freezing. Both solutions suffer high heat loss due to the inefficiencies of convective and radiant heating, and the enclosure adds cost and a potential icing problem of its own.

These and other limitations of the prior art will become apparent to those of skill in the art upon a reading of the following descriptions and a study of the several figures of the drawing.

SUMMARY

An example ice merchandiser with inventory monitoring system includes an ice merchandiser having an icebox defining a volume bounded, at least in part, by a top surface, a bottom surface, a front surface, and a back surface, a LiDAR module having a field-of-view, the LiDAR module being disposed within the volume of the icebox and positioned proximate to the top surface such that the field-ofview of the LiDAR module is at least partially directed towards the bottom surface to obtain distance data, a controller disposed outside of the volume of the icebox, and a cable including power and data lines connecting the controller to the LiDAR unit, whereby the controller provides power to the LiDAR module and can obtain the distance data from the LiDAR module.

The controller preferably includes a network interface which allows the controller to communicate with a remote server over, for example, the internet. Also, additional sensors can be provided to monitor the operation of the ice merchandiser, including temperature sensors within and/or outside of the icebox and pressure sensors and pressure sensors on, for example, the compressor intake and outtake lines, which can also be communicated to the remote server.

An example method for remotely monitoring inventory includes detecting, with a LiDAR module having a field-of-view within storage volume, a time-of-flight (TOF) of an electromagnetic wave transmitted by the LiDAR module and then reflected back from an inventory within the storage volume that is within the field-of-view to develop LiDAR data, digitally transmitting the LiDAR data to a controller, converting the LiDAR data to an estimate of inventory within storage volume; and digitally communicating the estimate of inventory over a network to an inventory-tracking server.

An example monitoring system comprises a LiDAR module including (a) a printed-circuit (PC) board; (b) a LiDAR device electrically and thermally coupled to the PC board; (c) at least one heating element electrically and thermally coupled to the PC board in proximity to the LiDAR device to heat the LiDAR device by thermal conduction through a thermally conductive layer of the PC board; and (d) a serial data input/output (I/O) port coupled to the LiDAR device. The example monitoring system can further comprise a controller having a serial data I/O port; and a cable including at least one serial data line coupling the serial data I/O port of the controller to the serial data I/O port of the LiDAR module and power lines to power the LiDAR module.

An advantage of the systems, methods and apparatus described herein is the use of LiDAR modules to obtain distance data within an icebox of an ice merchandiser which can be placed at an angle within the icebox and does not suffer from echoes and other artifacts generated by the use of ultrasonic sensors in the prior art.

Another advantage of the systems, methods and apparatus described herein is that LiDAR devices are heated by conduction through a thermally conductive layer of a multilayer circuit board, which is more effective than the radiant and/or convective heating of sensors as described in the prior art.

A still further advantage of certain embodiments of the systems, methods and apparatus described here is that additional sensor data, such as temperature, pressure, etc. can be provided to a server over a network to allow both the inventory and proper operation of a number of ice merchandisers to be remotely monitored.

These and other embodiments, features and advantages will become apparent to those of skill in the art upon a reading of the following descriptions and a study of the several figures of the drawing.

BRIEF DESCRIPTION OF THE DRAWINGS

Several example embodiments will now be described with reference to the drawings, wherein like components are provided with like reference numerals. The example embodiments are intended to illustrate, but not to limit, the invention. The drawings include the following figures:

FIG. 14 is a side elevational view of an ice merchandiser having one or more LiDAR modules supported at an angle near the top and front internal surfaces of an icebox;

FIG. 15 is a block diagram of an example LiDAR module circuit;

FIG. 17 is a block diagram of an example controller circuit; and

DETAILED DESCRIPTION OF EXAMPLE EMBODIMENTS

Figure 1:
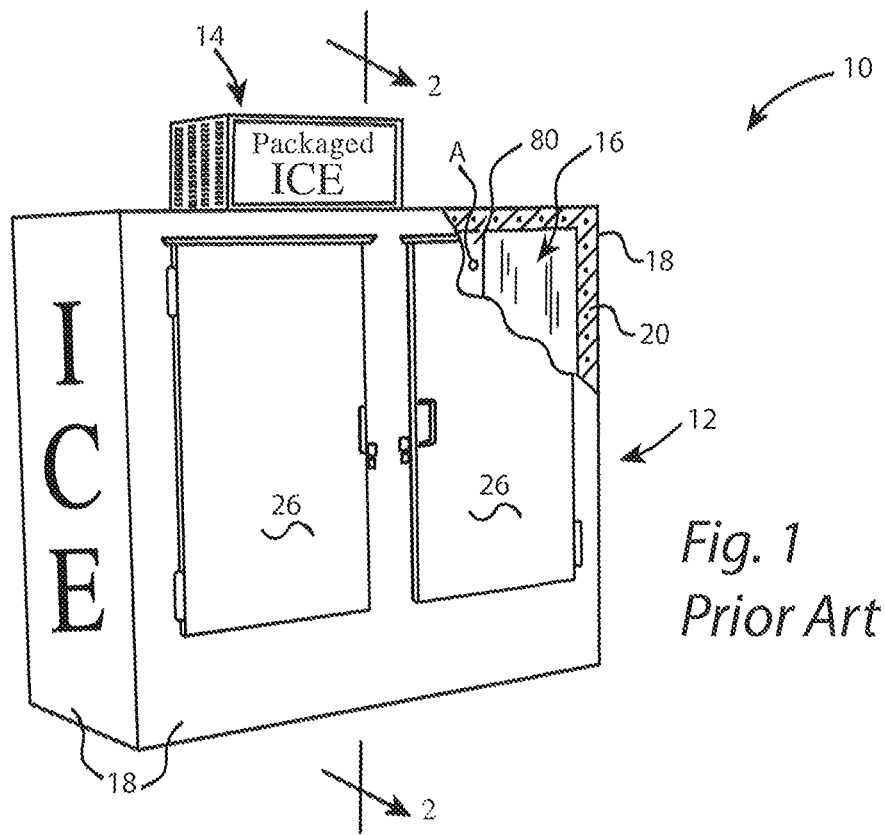
FIG. 1 is a perspective view of a conventional ice merchandiser.
Figure 2:
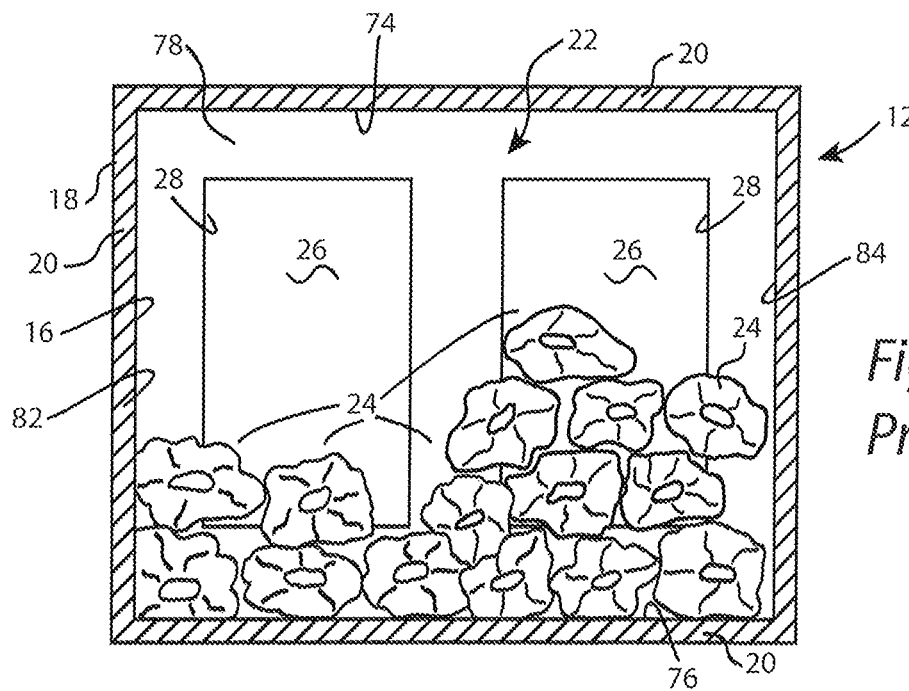
FIG. 2 is a cross-sectional view taken along line 2-2 of FIG. 1 further illustrating an icebox portion of the ice merchandiser and an example inventory of bagged ice.
Figure 3:
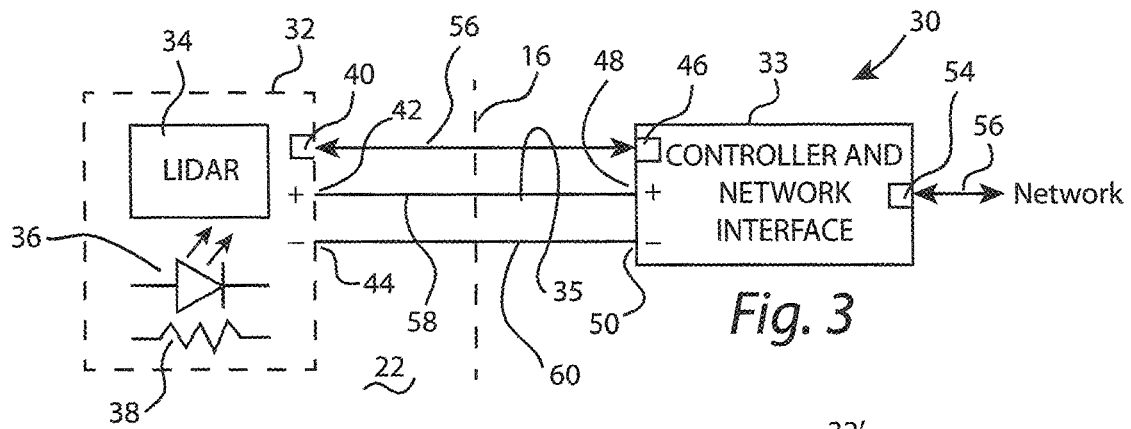
FIG. 3 is a block diagram of a monitoring system for an ice merchandiser.

FIGS. 1 and 2 illustrate an example ice merchandiser 10 that is suitable to be built or retrofitted with a cost effective, easy to install and robust monitoring system. In FIG. 3, a monitoring system 30 includes a LiDAR module 32 installed, for example, within the internal volume 22 of the icebox 16 of an ice merchandiser, a controller/network interface ("controller") 33 located outside of the icebox 16, and a cable 35 coupling the LiDAR module 32 to the controller 33. The LiDAR module 32 includes a LiDAR device 34, one or more heating elements 36 and 38, a serial data input/output (I/O) port 40, a power (+) input 42, and a ground (−) input 44. The controller 33 includes a serial data I/O port 46, a power (+) output 48, a ground (−) output 50, and a network interface 54 facilitating network communication 56.

LiDAR is an acronym for "Light Detection and Ranging" and refers to a method that measures a distance to a target by illuminating the target with laser light and measuring the reflected light with a sensor. As used herein, a LiDAR device uses the principle of Time-of-Flight (ToF) to measure the time taken by light to travel from the LiDAR device to a surface and then back to the LiDAR device. The measured ToF can be converted to the distance to the surface (e.g. to a bag of packaged ice, in the present example), which can then be used to determine the current inventory level of the ice merchandiser.

A suitable LiDAR device 34 is the VL53L0X sensor marketed by STMicroelectronics NV and described in datasheet DociD029104 Rev. 2 dated April 2018, incorporated herein by reference. The VL53L0X sensor is a Time-of-Flight (ToF) laser-ranging module providing accurate distance measurement up to two meters. The VL53L0X sensor integrates a SPAD array (Single Photon Avalanche Diodes) detection array and has a 940 nm VCSEL emitter (Vertical Cavity Surface-Emitting Laser), that emits infrared (I/R) light invisible to the human eye but, when coupled with internal physical infrared filters, enables longer ranging distances, higher immunity to ambient light, and better robustness to cover glass optical crosstalk.

Resistive element 36 is, in this non-limiting example, a high-powered Light Emitting Diode (LED) such a Cree® (Lampe ML-E LED ("ML-E LED") marketed by Cree, Inc. of Durham, North Carolina and described in data sheet CLD-DS30 REV 11 G copyright 2010-2017, incorporated herein by reference. The efficiency of the ML-E LED is about 50%, providing about 1.3 watts of heat and a cool, white light which can be used to illuminate the internal volume 22 of the icebox 16. The ML-E LED is packaged in a low, square 3.5-mm×3.5-mm surface mount package well suited for thermal conduction through a layer of a PC board, as will be discussed subsequently.

Resistive element 38 can be, for example, a surface mount resistor, that can be coupled in series with the resistive element (LED) 36 to serve as a ballast and to provide additional heat to heat the LiDAR device 34. As will be discussed subsequently, the resistive elements 36 and/or 38 use thermal conduction to heat the LiDAR device 34, rather than the relatively inefficient convective or radiative heating of camera elements of the prior art.

With continuing reference to FIG. 3, the serial data I/O port 40 of the LiDAR module 32 can include, for example, a RS-485 transceiver, which is inexpensive to implement, tolerant to noise and tolerant to voltage offset between the LiDAR module 32 and controller 33. The LiDAR module is powered, in the current example, from a 12-volt D.C. supply (not shown) which can be stepped down via a linear regulator to lower voltages, e.g. 3.3 volts D.C., to power the LiDAR device 34. The higher voltage supply is useful, however, to power the resistive elements despite the inherent voltage drop in the cables leading to the LiDAR module 32.

The serial I/O data port 46 of controller 33 is likewise implemented with a RS-485 transceiver in this example. Also, in this example, it is the controller 33 which provides the 12-volt D.C. supply to the LiDAR module 32 via the power (+) output 48 and ground (−) output 50. A network interface 54 of the controller 33 allows communication over a local or wide area network, such as the internet, to an inventory control server (not shown).

The cable 35 connecting the LiDAR module 32 to the controller 33 includes one or more data lines 56, a power line 58 and a ground line 60. In this non-limiting example, there are three data lines 56 to implement the following cable wiring:
1. Ground
2. Data+RS-485
3. Data−
4. Chain
5. +12 Volts The cable 35, in this example, extends through an aperture provide though one of the walls of the ice merchandiser. See, for example, aperture "A" through a rear wall 80 of ice storage unit 12 of FIG. 1 and FIG. 14. These apertures may be provided by the manufacturer to permit defroster wires into the icebox 16 or may be provided by a retrofitter of the monitoring system 30.

Figure 4:
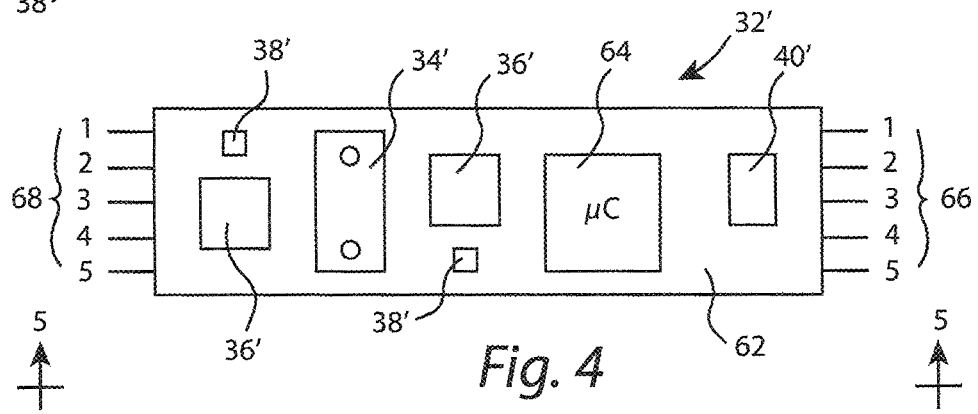
FIG. 4 is a top plan view of an example LiDAR module.

FIG. 4 is a top plan view of an example of a LiDAR module 32' which includes a multilayer printed circuit (P/C) board 62 which supports the LiDAR device 34', two LEDs 36', two surface mount resistors 38', a RS-485 transceiver 40' and microcontroller 64. In this example, the LEDs 36' are configured as two "parallel" LEDs connected in series with the two resistors 38' across the 12-volt power supply. The PC board 62 is provided with five upstream pins 66 and five downstream pins 68 which correspond to the aforementioned wiring of cable 35.

Figure 5:
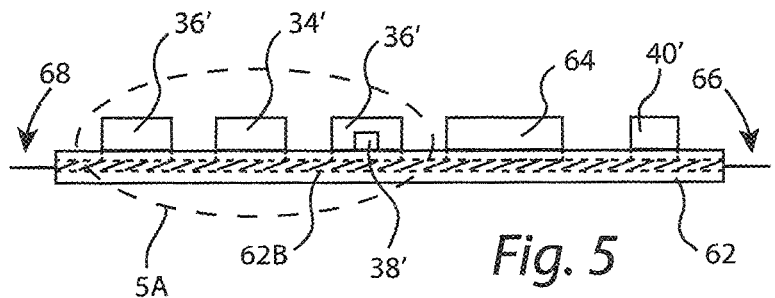
FIG. 5 is a side elevational view of the example LiDAR module taken along line 5-5 of FIG. 4.
Figure 5A:
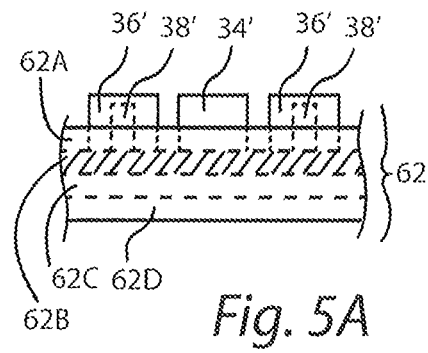
FIG. 5A is an enlarged view of the portion of the LiDAR module in FIG. 5 that is encircled by broken line 5A.

FIG. 5 is a front elevational view taken along line 5-5 of FIG. 4 to illustrate the multilayer configuration of the PC board 62. FIG. 5A is an enlarged view of the portion of PC board 62 that is encircled by broken line 5A. In this non-limiting example, the PC board 62 has four layers 62a, 62b, 62c and 62d, where layer 62b is a thermally conductive layer including, for example, copper or a copper alloy. The LEDs 36', the resistors 38' and the LiDAR device 34' are thermally coupled to the thermally conductive layer 62b such that the heat generated by the LEDs 36' and the resistors 38' heats the LiDAR device 34' by conduction through the thermally conductive layer 62b to prevent the frosting or fogging of the LiDAR device 34' by the frigid air in the icebox 16.

Figure 6:
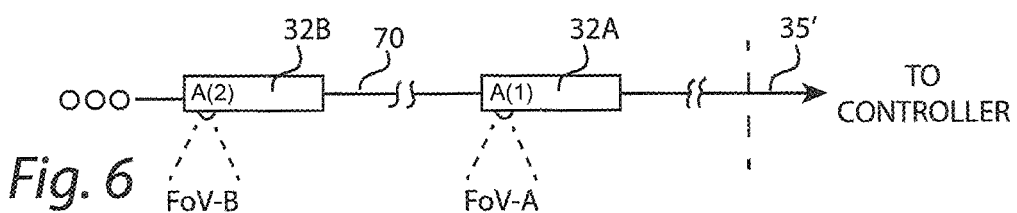
FIG. 6 illustrates a daisy-chain configuration of LiDAR modules.

FIG. 6 illustrates a serial daisy-chain configuration of LiDAR modules 32. A first or "upstream" LiDAR module 32A is coupled to the controller 33 by a cable 35' plugged into its upstream pins 66 as described previously. Power, ground, and Data +/− lines are paralleled for all sensor boards with inter-module cables 70 that are figured similarly to the cable 35' and which extend from the downstream pins 68 of an upstream LiDAR module to the upstream pins 66 of the LiDAR module downstream from it. However, a separate chain line (pin 4) is connected from a bus master of the controller to the first LiDAR module 32A, another chain line is connected from the first board 32A to the second board 32B, etc. The chain line is used to suppress data reception for downstream boards. In this way, the boards can be uniquely addressed at startup without requiring any pre-configuration on the part of the installer. An example process is as follows:

- At startup, LiDAR module 32A is active and downstream LiDAR modules 32b and beyond are inactive. A controller configures a unique address A(1) to LiDAR module 32A.
- LiDAR module 32A releases LiDAR module 32B via the chain wire (pin 4) between them. LiDAR, modules downstream of LiDAR module 32B are still inactive. The controller configures a unique address A(2) to LiDAR module 32B.
- LiDAR module 32B releases the next downstream LiDAR module (not shown) via the chain wire (pin 4). The controller configures a unique address the released downstream LiDAR module, which then releases the next downstream LiDAR module.

This continues until all LiDAR modules in the daisy chain have been assigned a unique address ("enumerated") by the controller.

After this above enumeration process, the controller can now individually address each board. A simple poll-response protocol with a checksum can be implemented to allow a variety of command and status messages to pass between the controller and the various LiDAR modules, each of which has its own field-of-view (FoV), such as FoV-A for LiDAR module 32A and FoV-B for LiDAR module 32B.

Figure 6A:
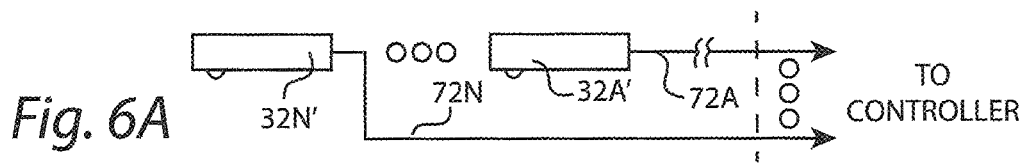
FIG. 6A illustrates a parallel configuration of LiDAR modules.

FIG. 6A illustrates a parallel communication protocol between a controller and a plurality of LiDAR modules 32A' . . . 32N'. In this protocol, each LiDAR module is connected to the controller by its own cable 72, e.g. cables 72A . . . 72N. It should be noted that the cables need only have 4 wires, and the LiDAR modules need only 4 "upstream" pins, since the chain wire is not required in this configuration. This alternative configuration is useful for, perhaps, one or two LiDAR modules, but quickly become cumbersome with the number of cables 72 required for larger numbers of LiDAR modules.

LiDAR modules can be attached or supported by interior surfaces of an icebox in a number of ways, including fasteners, adhesives, magnets, brackets, etc. With reference to FIGS. 1 and 2, it will be appreciated that the volume 22 of the icebox 16 is bounded, at least in part by a top surface 74, a bottom ("support") surface 76, a front surface 78 and a back surface 80. Most configurations of iceboxes will also have opposing side surfaces 82 and 84. Most generally, the LiDAR module(s) will be disposed within the volume 22 of the icebox 16 and will be positioned proximate to the top surface 74 so that its field of view is at least partially directed towards the bottom surface 76 to obtain distance data to, for example, stacks of packaged ice bags.

Figure 7:
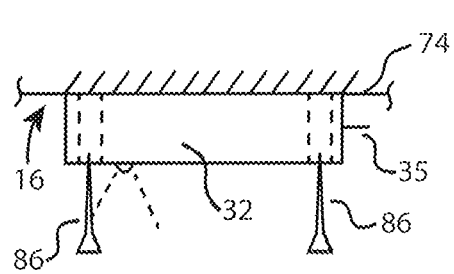
FIG. 7 illustrates an attachment of a LiDAR module to an internal portion of an icebox using fasteners.
Figure 8:
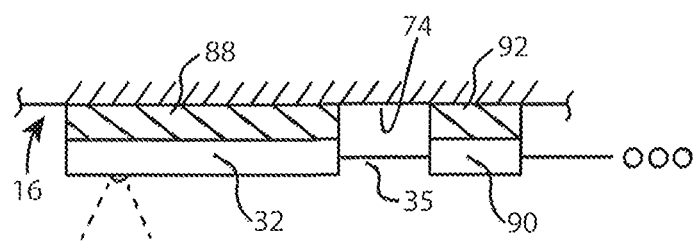
FIG. 8 illustrates an attachment of a LiDAR module and a cable to an internal portion of an icebox using magnets.

FIG. 7 illustrates the attachment of a LiDAR module 32 to, for example, top surface 74 of the icebox 16 with fasteners 86, represented generically here by sheet metal screws. FIG. 8 illustrates the attachment of a LiDAR module 32 to top surface 74 of the icebox 16 with a magnet 88. The cable 35 coupling the LiDAR module 32 to the controller (not shown) can be attached to the top surface 74 with a harness 90 provided with a magnet 92. It will be appreciated that other attachment methods can also be used, including adhesives, brackets, etc.

Figure 9:
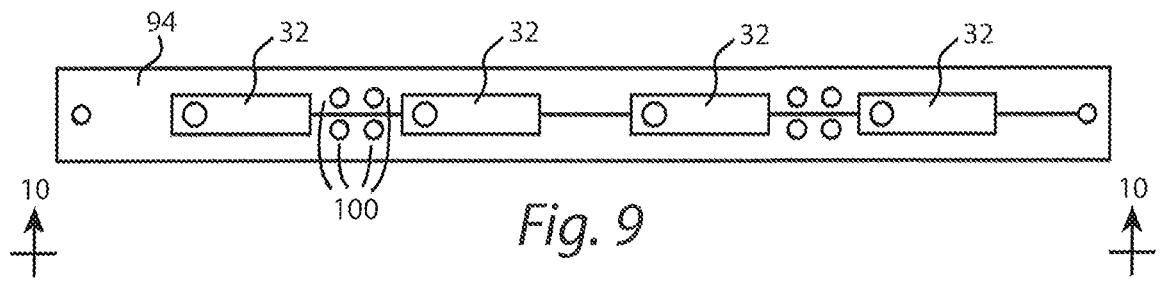
FIG. 9 is a top plan view of a rail that can support a plurality of LiDAR modules.
Figure 10:
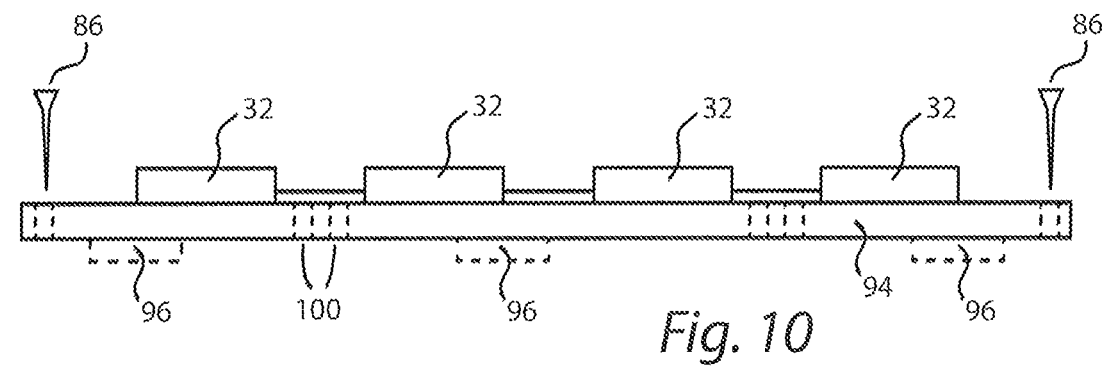
FIG. 10 is a side elevational view taken along line 10-10 of FIG. 9.

FIG. 9 is a top plan view of a rail 94 that can support a plurality of LiDAR modules 32 and FIG. 10 is a side elevation view taken along line 10-10 of FIG. 9. The rail 94 can be attached to an inner surface of the icebox 16 as described before, e.g. with fasteners 86, magnets 96, adhesives, brackets etc.

Figure 11:
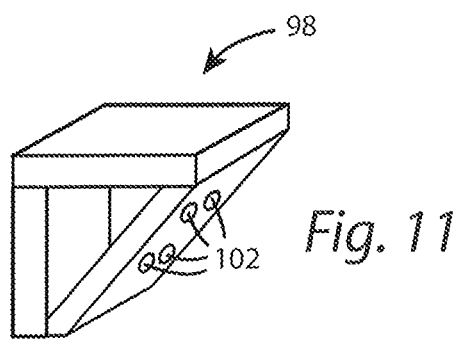
FIG. 11 is an example of an angle-bracket that can be used to attach the rail of FIGS. 9 and 10 to an internal portion of an icebox.

FIG. 11 illustrates a bracket 98 for attaching the rail 94 to inner surfaces of the icebox 16 at an angle. For example, the rail 96 can be attached to bracket 98 by lining up holes 100 of rail 94 with holes 102 of bracket 98 and fastening the two members together with, for example, screws, nuts and bolts or rivets (not shown). The bracket 98 can then be attached at the intersection of the top surface 74 and the front surface 78 so that the rail 94, and therefore the plurality of LiDAR modules 32 are held at an angle such that both the bottom surface 76 and the back surface 80 of the icebox are at least partially within the field-of-view of the LiDAR modules 32. Attaching the LiDAR modules 32 at an angle is advantageous in that they are easier and safer to install than if they were attached, for example, in the middle of the top surface 74 where they may damage the refrigerant lines or other critical components of the ice merchandiser.

Figure 12:
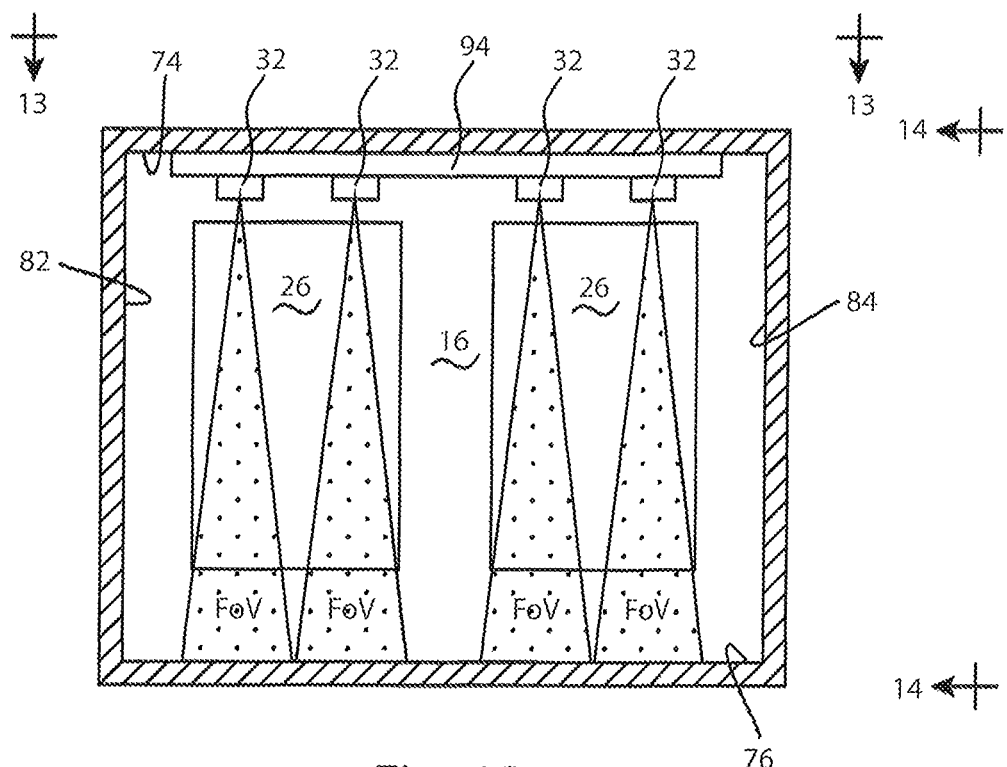
FIG. 12 is a is a cross-sectional view of an icebox portion of an ice merchandiser which has a rail with a plurality of LiDAR modules attached to a top surface of the icebox.
Figure 13:
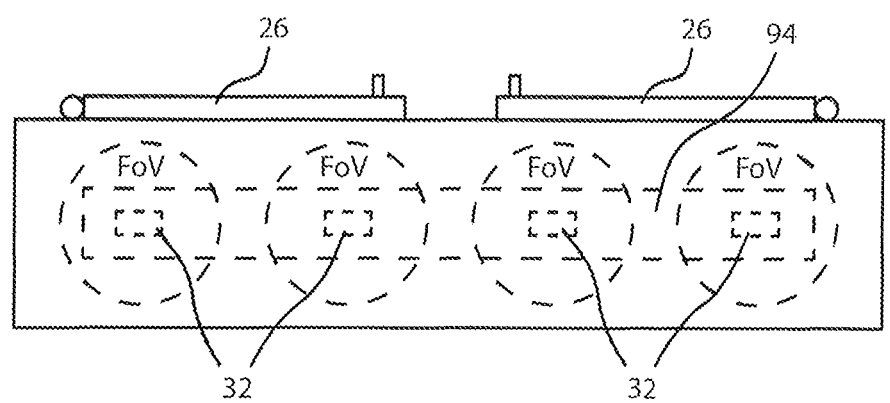
FIG. 13 is a top plan view of the ice merchandiser taken along line 13-13 of FIG. 12.

FIG. 12 is a cross-section view of an icebox 16 of an ice merchandiser which has a rail 94 with a plurality of LiDAR modules 32 attached to a top surface 74. FIG. 13 is a top plan view taken along line 13-13 of FIG. 12. In the example embodiment of FIGS. 12 and 13, the rail 94 is attached near the center of the top surface 74 so that the FoV of each of the LiDAR modules 32 have axes that are substantially perpendicular to the bottom surface 76. By providing a number of LiDAR modules 32, the cumulative FoV of the modules covers much of the bottom surface 76 of the icebox 16.

FIG. 14 is a side elevational view of an ice merchandiser having one or more LiDAR modules 32 attached near the top surface 74 and front surface 78 of the icebox 16, e.g. supported by a rail (not shown). In this embodiment, the LiDAR module(s) 32 are supported at an angle so that at least a portion of both the bottom (support) surface 76 and the back surface 80 are within its FoV. The cable 35 is shown extending out of the icebox 16 through an aperture A in the back wall 80. This angled position for the LiDAR modules near the front of the ice merchandizer is advantageous in that it is less complicated and less dangerous to install that in the middle of the top surface 74 of the icebox 16 for reasons set forth previously.

FIG. 15 is a block diagram of an example LiDAR module circuit 104 including microcontroller 64, LiDAR device 32, heating element (LED) 36, heating element (resistor) 38, random access memory (RAM) 106, read-only memory (ROM) 108, power control 110, I/O interface 112 and I/O interface 114. The microcontroller 64 can execute program instructions ("code segments") stored, for example, in ROM 108 to control the LiDAR device 32, implement communication protocols, control (and dim) the LED 36 via power control 110, etc. The I/O interfaces 112 and/or 114 can be implemented, in whole or in part by the aforementioned I/O port 40 (see FIG. 4) of the LiDAR module 32.

Figure 16:
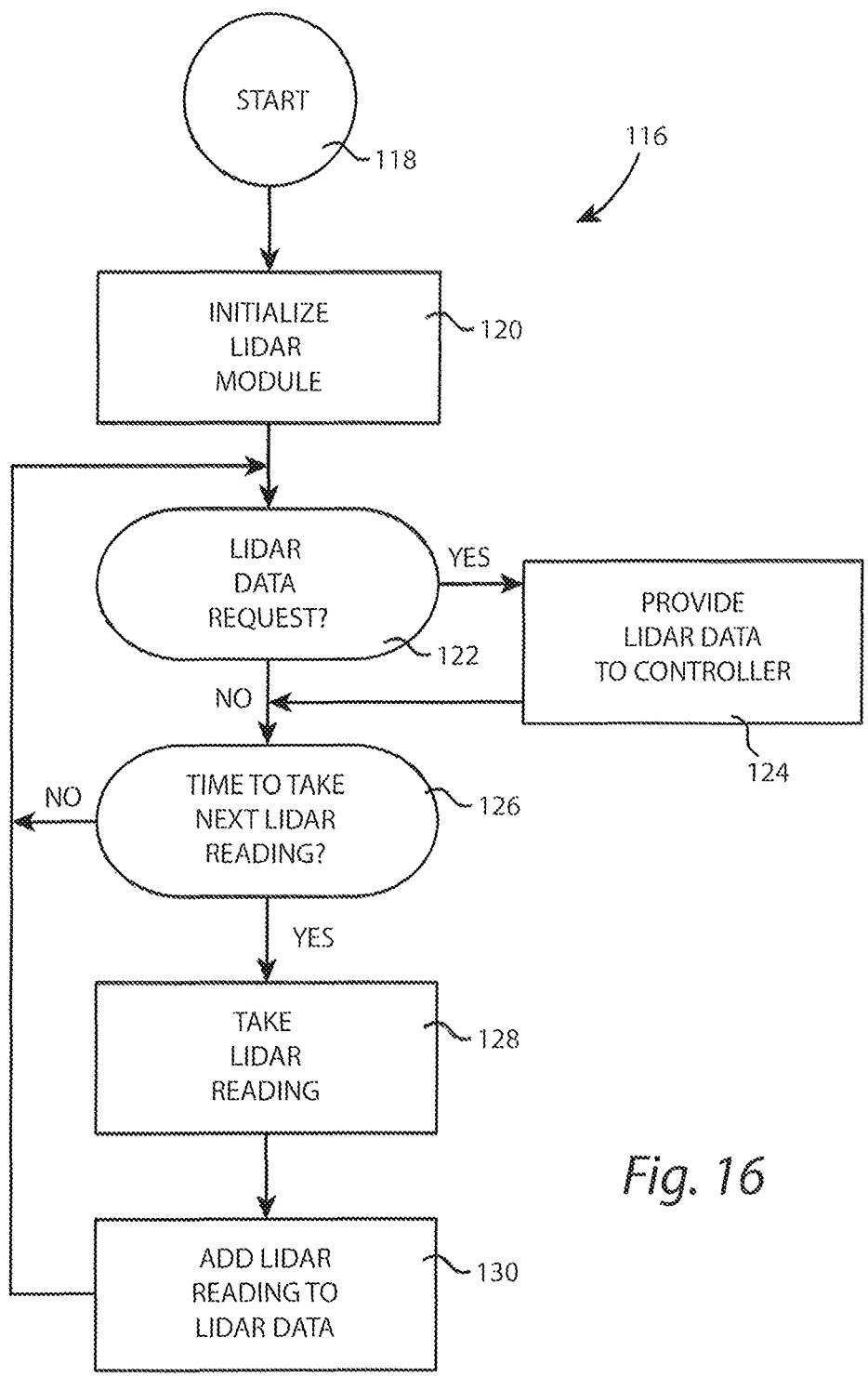
FIG. 16 is a flow diagram of an example process implemented by a LiDAR module circuit of FIG. 15.

FIG. 16 is a flow diagram of an example process 116 implemented by the LiDAR module circuit 104 of FIG. 15. More particularly, process 116 can be implemented by code segments stored, for example, in non-transitory computer readable media such as ROM 108 and executed by the microcontroller 64 (FIG. 15). Process 116 starts with operation 118, typically during the initial power-up of the LiDAR module circuit 104. Next, in an operation 120, the LiDAR module is initialized, e.g. by communicating with the controller to assign it a unique address as described above. Next, in an operation 122, it is determined if it is time to obtain distance data from the LiDAR module. If so, an operation 124 provides LiDAR distance data to store in memory, such as RAM 106. Next, in an operation 126, it is determined if it is time to take the next LiDAR reading with the LiDAR module. If not, process control is returned to operation 122. If it is time to take the next LiDAR reading with the LiDAR module, the reading(s) are taken in operation 128 and added to the LiDAR distance data stored on the LiDAR module, e.g. in RAM 106 in an operation 130. Process control is then returned to operation 122.

FIG. 17 is a block diagram of an example controller and network interface ("controller") circuit 132 that includes a microcontroller 134, network interface 52, RAM 136, ROM 138, first I/O interface 140, second I/O interface 142, and third I/O interface 144. The I/O interfaces 140, 142 and 144 can be implemented, in whole or in part, by the aforementioned serial data I/O port 46 of FIG. 3. The microcontroller 134 can execute program instructions ("code segments") stored, for example, in ROM 138 to implement various controller functions. The network interface 52 allows communication with remote servers (not show) via a network, such as a local area network (LAN) or a wide area network (WAN) such as the internet.

Figure 18:
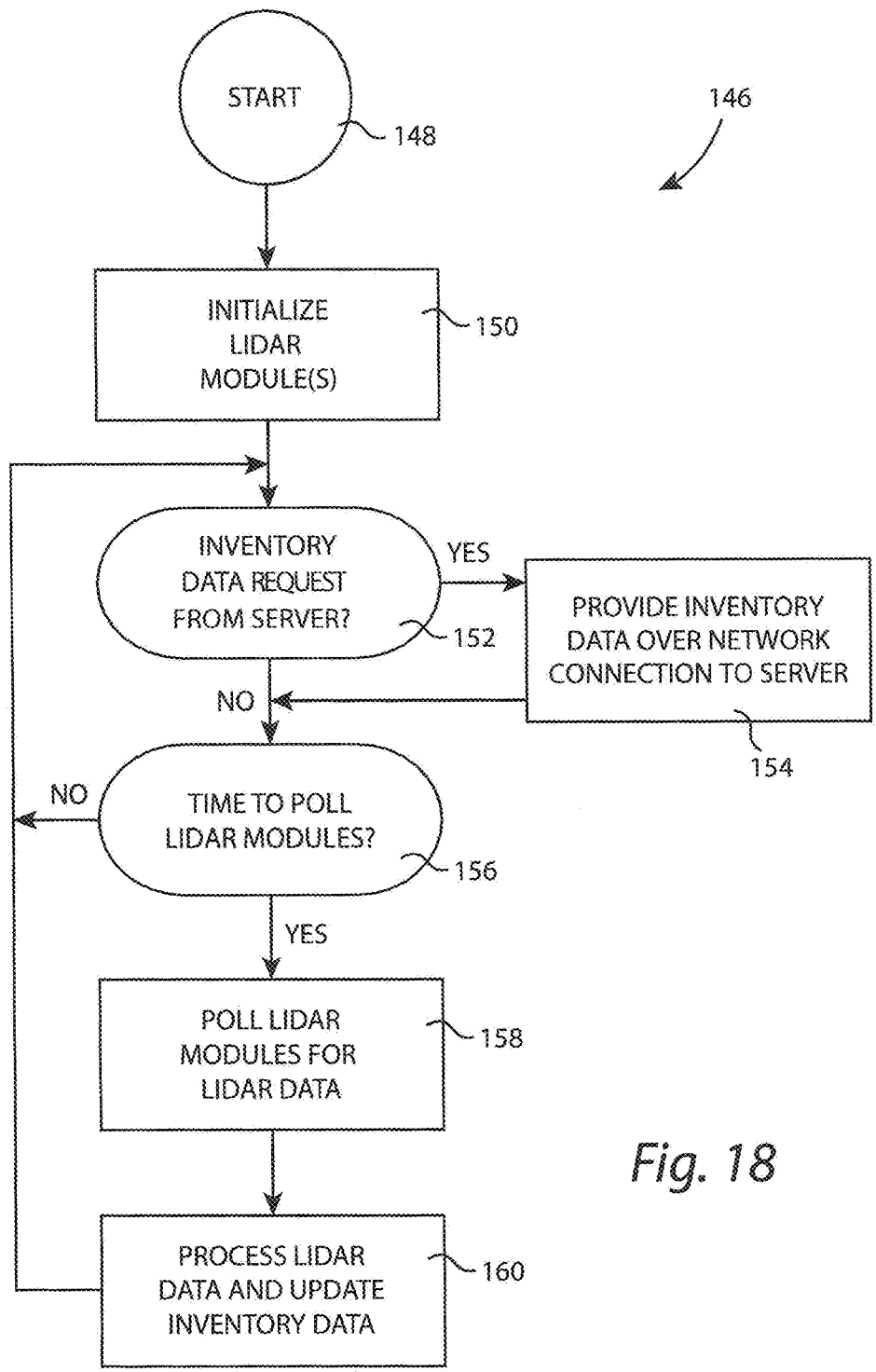
FIG. 18 is a flow diagram of an example process implemented by the controller circuit of FIG. 17.

FIG. 18 is a flow diagram of an example process 146 implemented by the controller circuit 132 of FIG. 17. The process 146 can be implemented by code segments stored, for example, in non-transitory computer readable media such as ROM 138 and executed by the microcontroller 134 (FIG. 17). Process 146 starts with operation 148, typically during the initial power-up of the controller circuit 132 (FIG. 17). Next, in an operation 150, the LiDAR module(s) are initialized, e.g. by assigning each LiDAR module a unique address, as was discussed above with reference to FIG. 6. Next, in an operation 152, it is determined if there is an inventory data request from, for example, a remote server via the network interface 52 (FIG. 17). If so, the controller circuit 132 communicates with the remote inventory control server via the network interface 52 in an operation 154 to provide inventory data and, optionally, other information concerning the operation of the ice merchandiser such as icebox temperature, coolant fluid pressure, etc. Next, in an operation 156 it is determined if it is time to poll the LiDAR modules to receive distance data. If not, process control returns to operation 152, but if so an operation 158 will sequentially poll the LiDAR modules by their unique addresses for LiDAR distance data. The cumulative distance data from the LiDAR modules is then processed and the estimated inventory data is updated in an operation 160. Operational control is then returned to operation 152.

As noted above, additional sensor readings concerning the operation of the ice merchandizer can be provided by the controller circuit 132 to a remote server (not shown) over the network interface 52. For example, auxiliary temperature sensors can be connected to I/O interface 142 of FIG. 17 to provide icebox temperature, ambient temperature, etc. to the remote server over the internet. As another example, pressure sensors can be provided at the input and the output of the compressor (not shown) to determine if the cooling system is operating properly. With such additional sensor data, the remote server can determine if the ice merchandiser is operating properly.

It should be noted that the remote server can comprise one ore more real or virtual computers operating over the internet or in the Cloud, and that the remote server can monitor many ice merchandisers located at various different geographical locations to facilitate the delivery of products and/or to initiate service calls if an ice merchandiser is not working properly. It should also be noted that the remote server can provide commands, software updates, etc. over the internet to correct and/or update the functionality of the controller and/or LiDAR modules.

Although various embodiments have been described using specific terms and devices, such description is for illustrative purposes only. The words used are words of description rather than of limitation. It is to be understood that changes and variations may be made by those of ordinary skill in the art without departing from the spirit or the scope of various inventions supported by the written disclosure and the drawings. In addition, it should be understood that aspects of various other embodiments may be interchanged either in whole or in part. It is therefore intended that the claims be interpreted in accordance with the true spirit and scope of the invention without limitation or estoppel.

What is claimed is:

1. An ice merchandiser with inventory monitoring system comprising:
    an ice merchandiser including an icebox defining a volume bounded, at least in part, by a top surface, a bottom surface, a front surface, and a back surface;
    a plurality of daisy chained Time-of-Flight (ToF) Light Detection and Ranging (LiDAR) modules each having a field-of-view (FoV), the plurality of LiDAR modules being disposed within the volume of the icebox and positioned proximate to the top surface such that the FoV of each LiDAR module is at least partially directed towards the bottom surface to obtain distance data such that a FoV of a LiDAR module does not overlap with a FoV of another LiDAR module, wherein each LiDAR module is associated with a unique address, whereby each of the LiDAR modules has a different address than the remainder of the plurality of LiDAR modules;
    one or more inter-module cables having wiring including power, ground and data lines for the plurality of daisy chained LiDAR modules;
    a controller disposed outside of the volume of the icebox;
    a cable having wiring including power, ground and data lines connecting the controller to an upstream LiDAR module of the plurality of LiDAR modules; and
    whereby the controller provides power to the plurality of LiDAR modules via the cable and the one or more inter-module cables and can obtain distance data from the plurality of LiDAR modules by communicating with each of the daisy-chained LiDAR modules using its unique address.

2. The ice merchandiser with inventory monitoring system as recited in claim 1 wherein the ice merchandiser includes at least one access opening through the front surface and at least one icebox access door associated with the access opening.

3. The ice merchandiser with inventory monitoring system as recited in claim 2 wherein each LiDAR module is positioned proximate to an intersection of the top surface and the front surface at an angle such that both the bottom surface and the back surface are at least partially within its FoV.

4. The ice merchandiser with inventory monitoring system as recited in claim 1 wherein the cable extends through an aperture provided through the back surface of the icebox.

5. The ice merchandiser with inventory monitoring system as recited in claim 1 wherein each LiDAR module comprises:
    (a) a printed-circuit (PC) board;
    (b) a LiDAR device electrically and thermally coupled to the PC board;
    (c) at least one heating element electrically and thermally coupled to the PC board in proximity to the LiDAR device to heat the LiDAR device by thermal conduction through a thermally conductive layer of the PC board;
    (d) a microcontroller coupled to the PC board;
    (e) upstream pins coupled to the PC board including power, ground and data pins; and
    (f) downstream pins coupled to the PC board including power, ground and data pins;
    wherein the upstream pins and the downstream pins correspond to the wiring of the cable and the one or more inter-module cables.

6. The ice merchandiser with inventory monitoring system as recited in claim 5 wherein the upstream pins and the downstream pins each further include a chain line pin, whereby each of the cable and the one or more inter-module cables include a chain line.

7. The ice merchandiser with inventory monitoring system as recited in claim 6 wherein wherein the chain line is used to suppress data reception for downstream LiDAR modules of the plurality of daisy chained LiDAR modules.

8. The ice merchandiser with inventory monitoring system as recited in claim 1 wherein each LiDAR module is attached to the top surface by at least one magnet.

9. The ice merchandiser with inventory monitoring system as recited in claim 1 wherein the cable and the one or more inter-module cables are each attached to the top surface by at least one magnet.

10. A monitoring system comprising:
   a plurality of daisy chained Time-of-Flight (ToF) Light Detection and Ranging (LiDAR) modules including each of which includes,
   (a) a printed-circuit (PC) board;
   (b) a LiDAR device electrically and thermally coupled to the PC board;
   (c) at least one heating element electrically and thermally coupled to the PC board in proximity to the LiDAR device to heat the LiDAR device by thermal conduction through a thermally conductive layer of the PC board; and
   (d) an upstream serial data input/output (I/O) port and a downstream serial I/O port coupled to the LiDAR device;
   one or more inter-module cables having wiring including the at least one serial data line;
   a controller having a controller serial data I/O port; and
   a cable having wiring including at least one serial data line coupling the controller serial data I/O port of the controller to the serial data I/O port of an upstream LiDAR module of the plurality of LiDAR modules, and
   wherein each of the LiDAR modules has a field-of-view (FoV) that does not overlap with a FoV of another LiDAR module, and wherein each LiDAR module is associated with a unique address, whereby each of the LiDAR modules has a different address than the remainder of the plurality of LiDAR modules;
   whereby the controller can obtain distance data from the plurality of LiDAR modules by communicating with each of the daisy-chained LiDAR modules using its unique address.

11. The monitoring system as recited in claim 10 wherein wiring of the cable and the wiring of the one or more inter-module cables each further include a power line and a ground line to provide power to the plurality of LiDAR modules.

12. The monitoring system as recited in claim 11 wherein the wiring of the cable and the one or more inter-module cables includes a chain line.

13. The monitoring system as recited in claim 12 wherein the chain line is used to suppress data reception for downstream LiDAR modules of the plurality of daisy chained LiDAR modules.

14. The monitoring system as recited in claim 10 further comprising a server communicating with the controller over a network.

15. The monitoring system as recited in claim 10 further comprising at least one magnet coupled to each LiDAR module of the plurality of LiDAR modules, whereby each LiDAR module can be attached to a surface by the at least one magnet.

16. The monitoring system as recited in claim 10 further comprising at least one magnet coupled to each of the cable and the one or more inter-module cables, whereby the cable and the one or more inter-module cables can be magnetically attached to a surface.

\* \* \* \* \*